United States Patent [19]
Tallman et al.

[11] Patent Number: 6,084,214
[45] Date of Patent: Jul. 4, 2000

[54] REFLOW SOLDER CONVECTION OVEN MULTI-PORT BLOWER SUBASSEMBLY

[75] Inventors: Steve Tallman, New Market, N.H.; Brian Daneau, Amesbury, Mass.; Kerem Durdag, Dover, N.H.

[73] Assignee: Conceptronic, Inc., Portsmouth, N.H.

[21] Appl. No.: 09/253,870

[22] Filed: Feb. 19, 1999

[51] Int. Cl.[7] .................................. F27B 9/10; F27D 7/04
[52] U.S. Cl. .......................................... 219/400; 219/388
[58] Field of Search .................................... 219/388, 400; 34/487, 488, 209, 210, 212, 216, 217, 219, 224, 221, 232, 233; 126/21 A; 99/474–477; 228/180.1, 180.21

[56] References Cited

U.S. PATENT DOCUMENTS

| | | | |
|---|---|---|---|
| 2,461,318 | 2/1949 | Folli | 219/400 |
| 4,512,327 | 4/1985 | Stiegler | 126/21 A |
| 4,750,416 | 6/1988 | Graham | 99/476 |
| 5,089,679 | 2/1992 | Eke | 126/21 A |
| 5,154,338 | 10/1992 | Okuno et al. | 219/388 |
| 5,345,061 | 9/1994 | Chanasyk et al. | 219/388 |
| 5,468,935 | 11/1995 | Wang | 219/400 |
| 5,747,775 | 5/1998 | Tsukamoto et al. | 219/400 |
| 5,786,567 | 7/1998 | Wang | 219/400 |
| 5,814,789 | 9/1998 | O'Leary et al. | 219/388 |

*Primary Examiner*—Joseph Pelham
*Attorney, Agent, or Firm*—Iandiorio & Teska

[57] ABSTRACT

A reflow solder convection oven with at least one heater element and at least one blower assembly in fluid communication with the heater element. The blower assembly includes a mount structure including at least one intake port and at least two supply ports, a housing connected to the mount structure, a fan wheel, and a motor attached to the fan wheel. The housing has an interior surface defining at least two pressurization zones, and at least two outtake regions, each outtake region proximate a supply port of the mount structure. The periphery of the wheel is positioned in the housing to form dual pressurization zones, the housing defining at least two spline curves along the interior surface thereof, each curve having a starting node proximate a pressurization zone and a terminating node proximate an outtake region.

11 Claims, 8 Drawing Sheets

REFLOW SOLDER CONVECTION OVEN MULTI-PORT BLOWER SUBASSEMBLY

FIELD OF THE INVENTION

This invention relates to a reflow solder convection oven with multi-port blowers or fans. This invention also relates to such blowers or fans used in environments other than reflow solder convection ovens.

BACKGROUND OF THE INVENTION

Reflow solder convection ovens are typically used in the production of printed circuit boards employing surface mount technology. Most convection ovens include a number of heating zones spaced along a conveyer which carries the printed circuit boards through the various heating zones. Each heating zone usually includes upper and lower heating elements, and a blower or fan associated with each heater element. The fan blows air or some other gas such as nitrogen through the heater element, and the heater element heats the gas before it moves over and about the printed circuit board.

In prior art systems, the currently available fans fail to provide uniform flow across the span of a given heater element. For example, the gas flow velocity on one edge of the heater element could be 20% less than on the opposite edge or at the location where the fan mounts to the heater element. And, the gas temperature also varies by as much as 20% across the heater element. These variations result in imprecise temperature controls and variable heating of the printed circuit boards which can adversely affect quality. Adding additional fans can be expensive and is not always possible due to space limitations.

BRIEF SUMMARY OF THE INVENTION

Accordingly, it is an object of this invention to provide an improved reflow solder convection oven.

It is a further object of this invention to provide such an oven which does not have wide variations in gas flow velocity or gas flow temperature across the span of the oven's heater elements.

It is a further object of this invention to provide an improved fan or blower for reflow solder convection ovens which has two or more supply ports for more evenly distributing the convection oven gas throughout the heater elements.

It is a further object of this invention to provide such a fan or blower which can be used in connection with systems and environments other than reflow solder convection ovens.

This invention results from the realization that a reflow solder convection oven with a more uniform gas flow across the heater panels or elements of the oven can be constructed by the use of novel blowers which include two or more spaced, typically diametrically opposed, supply ports and from the further realization that each such blower, if it has two diametrically opposed outtake regions and two diametrically opposed pressurization zones, is able to deliver a more uniform and tailored gas flow in convection ovens as well as in other systems.

This invention features a reflow solder convection oven with at least one heater element and at least one blower assembly in fluid communication with the heater element. The blower assembly typically comprises a mount structure including at least one intake port and at least two supply ports, a housing connected to the mount structure, a wheel and a motor for the wheel. The housing includes an interior surface defining at least two pressurization zones, and at least two outtake regions, each outtake region proximate a supply port of the mount structure. The wheel is rotatably disposed in the housing proximate the intake port of the mount structure, the periphery of the wheel positioned in the housing to form dual pressurization zones, the housing defining at least two spline curves along the interior surface thereof, each curve having a starting node proximate a pressurization zone and a terminating node proximate an outtake region. The blower assembly also includes a motor attached to the housing and connected to the wheel.

The two outtake regions of the housing are typically diametrically opposed. The outtake regions preferably have a radius. If there are only two pressurization zones, they are typically diametrically opposed from each other. There may, however, be three or more supply ports, three or more pressurization zones, and three or more outtake regions, each outtake region associated with a supply port.

The blower assembly of this invention features at least one intake port; at least two supply ports; a housing having an interior surface forming at least two pressurization zones and at least two outtake regions, each outtake region associated with a supply port; and a rotor (e.g. a fan wheel) disposed in the housing.

The two outtake regions of the housing, if there are only two such regions, are preferably diametrically opposed. Each outtake region also preferably has a radius. In addition, if there are two pressurization zones, they are also diametrically opposed from each other.

The invention also features a blower housing comprising a wheel in the housing and an interior surface formed in the shape of at least two spline curves, each spline curve having a starting node proximate a portion of the periphery of the wheel forming a pressurization zone and a terminating node spaced from the periphery of the wheel defining an outtake region such that there are at least two pressurization zones and two outtake regions.

BRIEF DESCRIPTION OF THE DRAWINGS

Other objects, features and advantages will occur to those skilled in the art from the following description of a preferred embodiment and the accompanying drawings, in which.

Figures 1, 2:
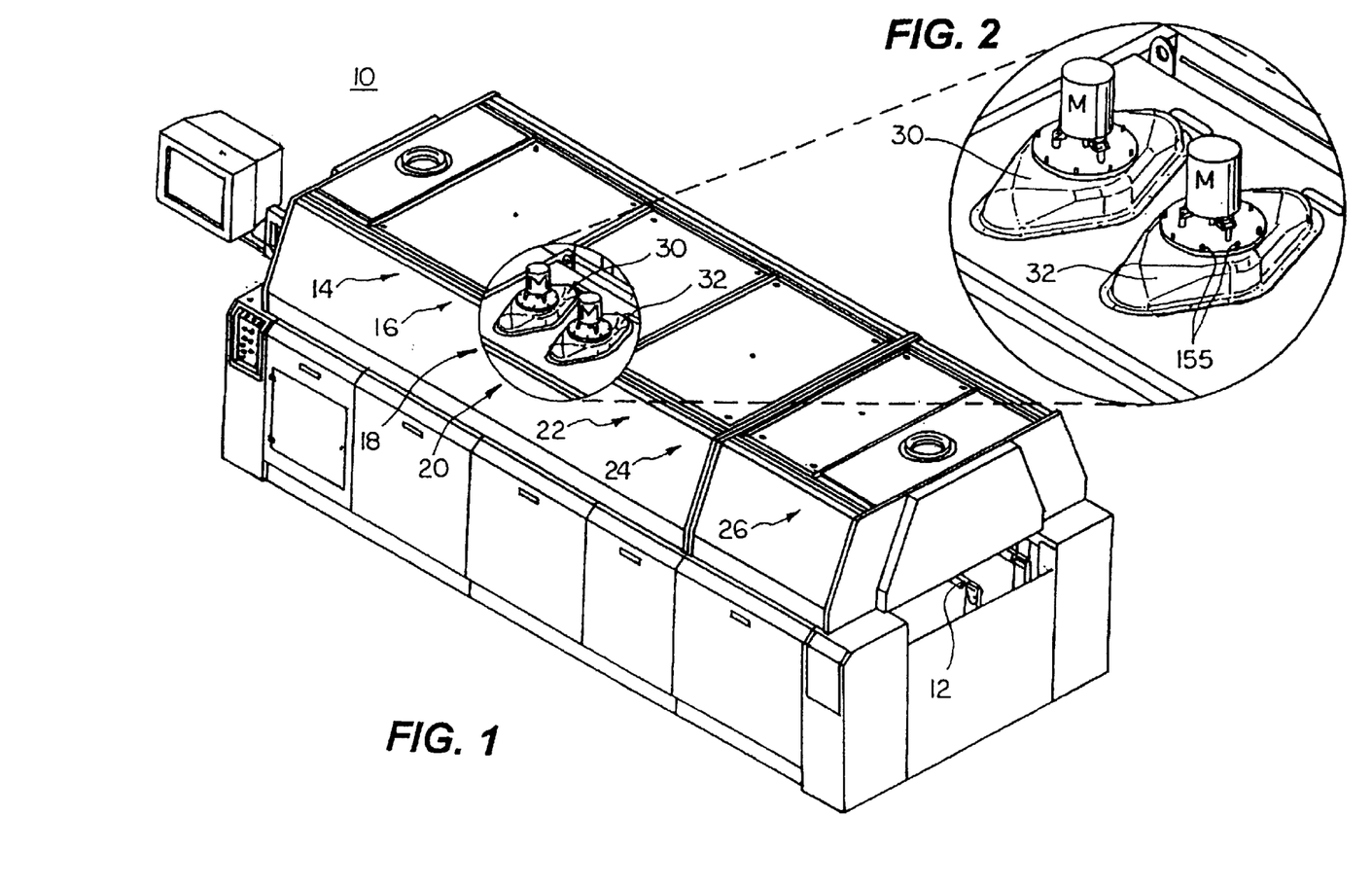
FIG. 1 is an isometric, cutaway view of the reflow solder convection oven of the subject invention.
FIG. 2 is an isometric view of two upper fan assemblies in accordance with the subject invention.

Reflow solder convection oven 10, FIG. 1 includes conveyer 12 for transporting printed circuit boards through heating zones 14, 16, 18, 20, 22, 24, and 26. Heating zone 14 may be, for example, a pre-reflow or "soak" zone and there may be more or less zones depending on the requirements of the printed circuit board manufacturer. The applicant of the subject invention currently sells 6, 8, 11, and 14 zone models.

Figure 3:
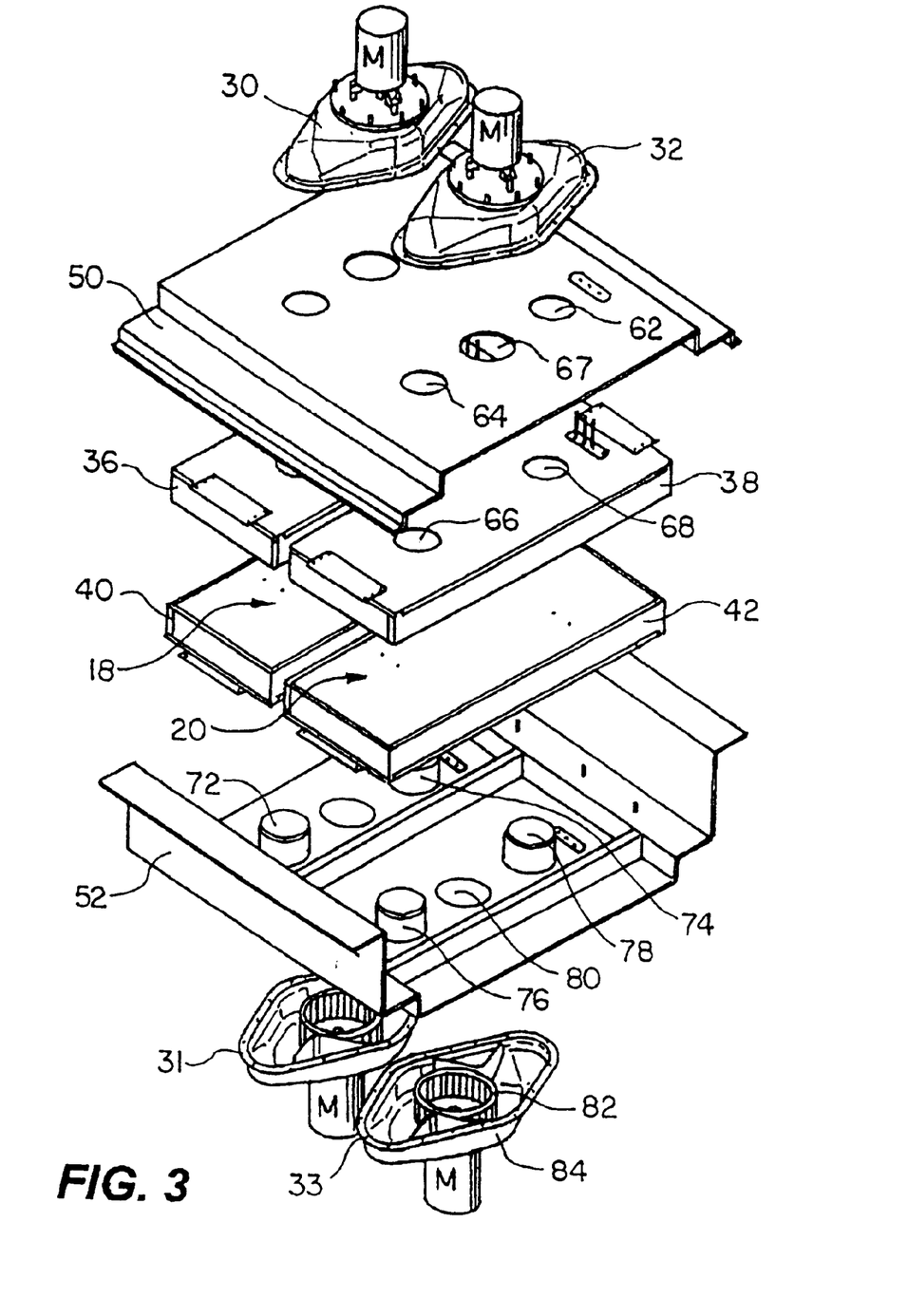
FIG. 3 is an exploded view of two zones of the convection oven shown in FIG. 1.
Figure 4:
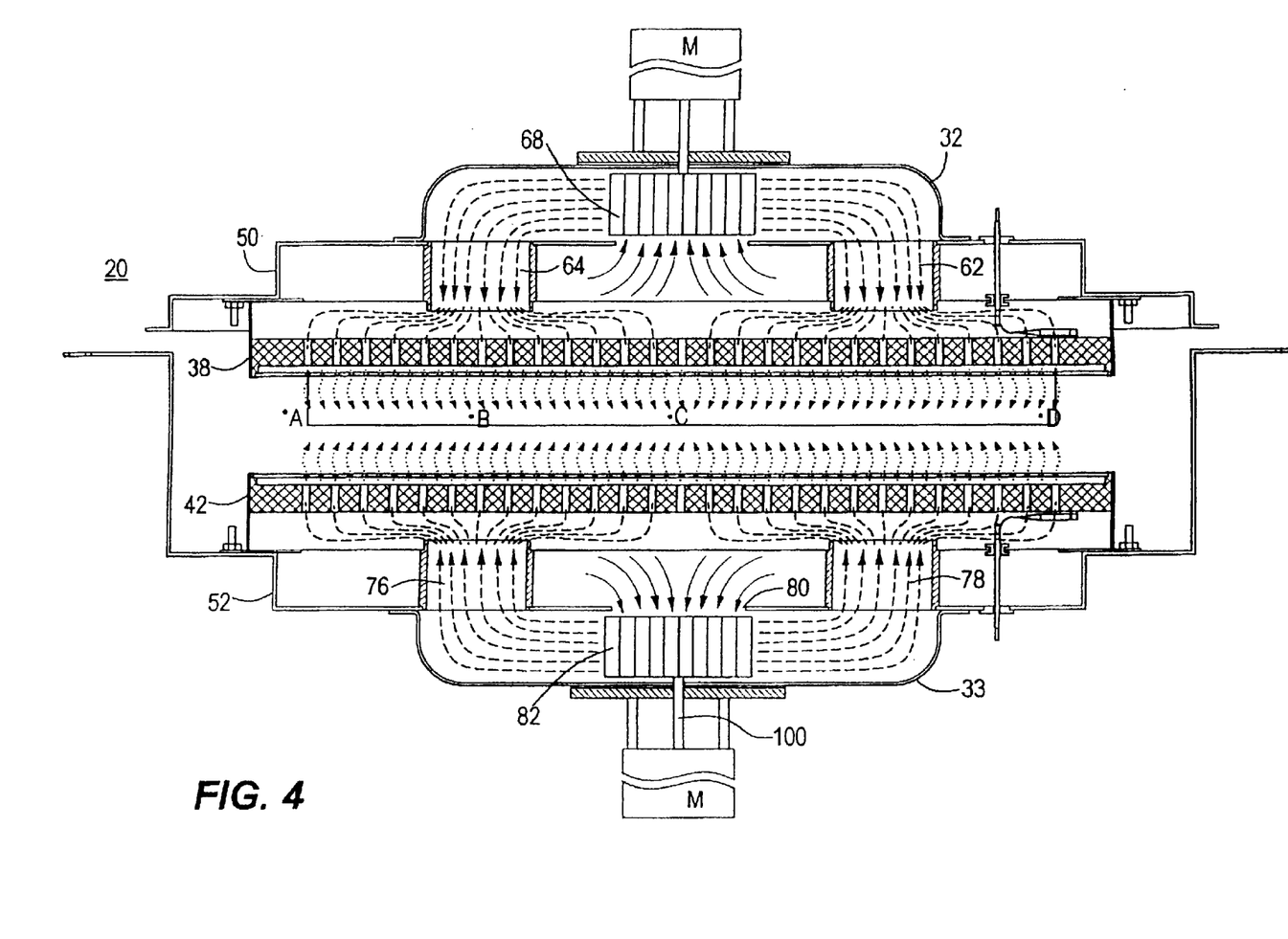
FIG. 4 is cross sectional view of the front of one of the zones shown in FIG. 3.

Fan 30, FIGS. 1, 2, and 3, is associated with upper heater element 36, FIG. 3 of zone 18 and fan 32 is associated with upper heater element 38 of zone 20. Each zone also typically includes lower heater elements, for example lower heater element 40 of zone 18 and lower heater element 42 of zone 20. Fan 31 is associated with heating element 40 and fan 33 is associated with heater element 42. Each fan has a conventional motor M. One heater element is shown in FIG. 4. The heater element could also be an exposed resistive wire exposed and could be on intake or outtake side of fan.

Each heater element is mounted to a mount structure ("bucket"), such as mount structure 50, which holds upper heater elements 36 and 38 and mount structure 52 which holds lower heater elements 40 and 42. Each fan is thus in fluid communication with a heater element via these mount buckets.

In accordance with this invention, each mount bucket has two supply ports per heater element. Accordingly, mount 50 has supply ports 62 and 64 for heater element 38 which also has corresponding associated supply ports 66 and 68. The intake for fan 32 is accomplished via port 67. Similarly, the intake for fan 33 is accomplished via intake port 80.

As shown for mount 52, heater element 40 receives gas from two supply ports 72 and 74 associated with fan 31 and heater element 42 receives gas from two supply ports 76 and 78 associated with fan 33.

As is more clearly shown in FIG. 4 heating zone 20, which includes upper heater element 38 and lower heater element 42, is able to provide a more uniform gas (e.g. air or nitrogen) volumetric and temperature distribution since, for example, intake 68 of fan 32 supplies approximately 50% of the gas intake to supply port 64 and 50% of the gas intake to supply port 62 insure that the temperature and velocity of the heating gas at points A, B, C, and D varies by less than 5%.

In prior art systems having only one supply port per heating element, such as supply port 64, the temperature and velocity of the heating gas at point A could vary by as much as 20% from point B. Thus, two different circuit board assemblies or the edges of a single circuit board assembly experienced different temperatures and gas flow velocities resulting in difficult to control processing requirements within the convection oven.

Figure 5:
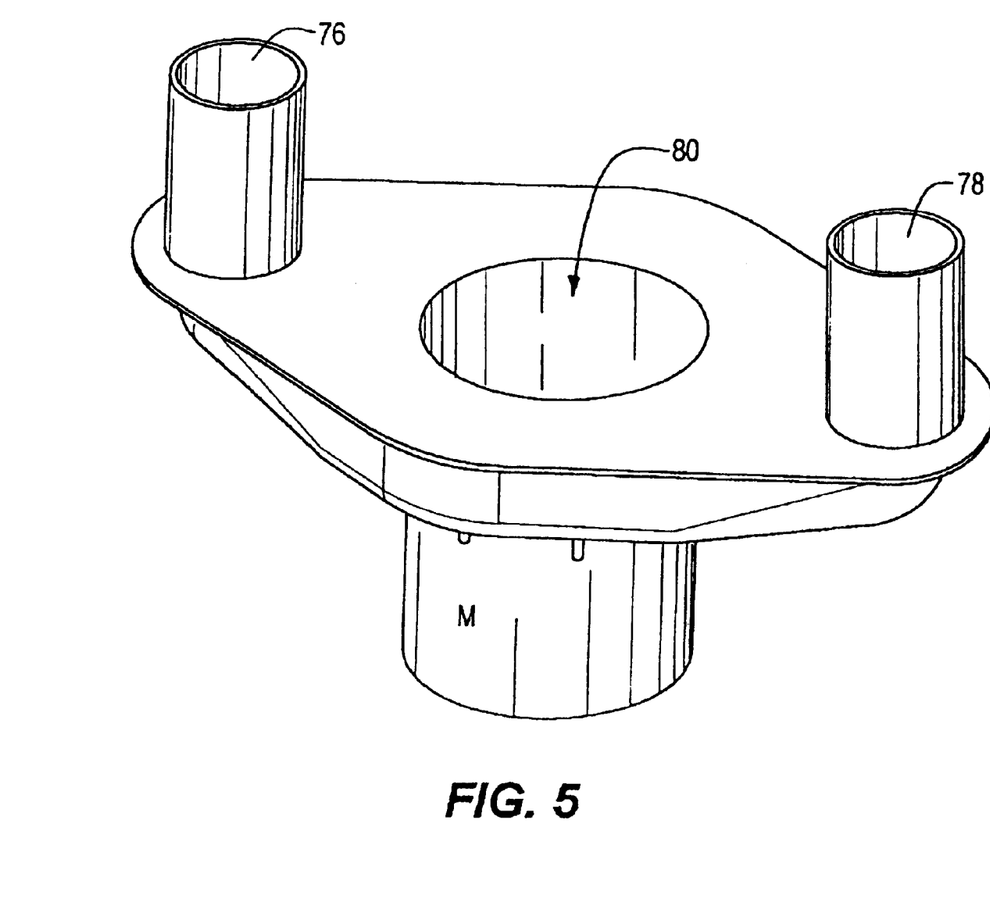
FIG. 5 is an isometric view of the fan assembly of the subject invention.
Figures 6, 7:
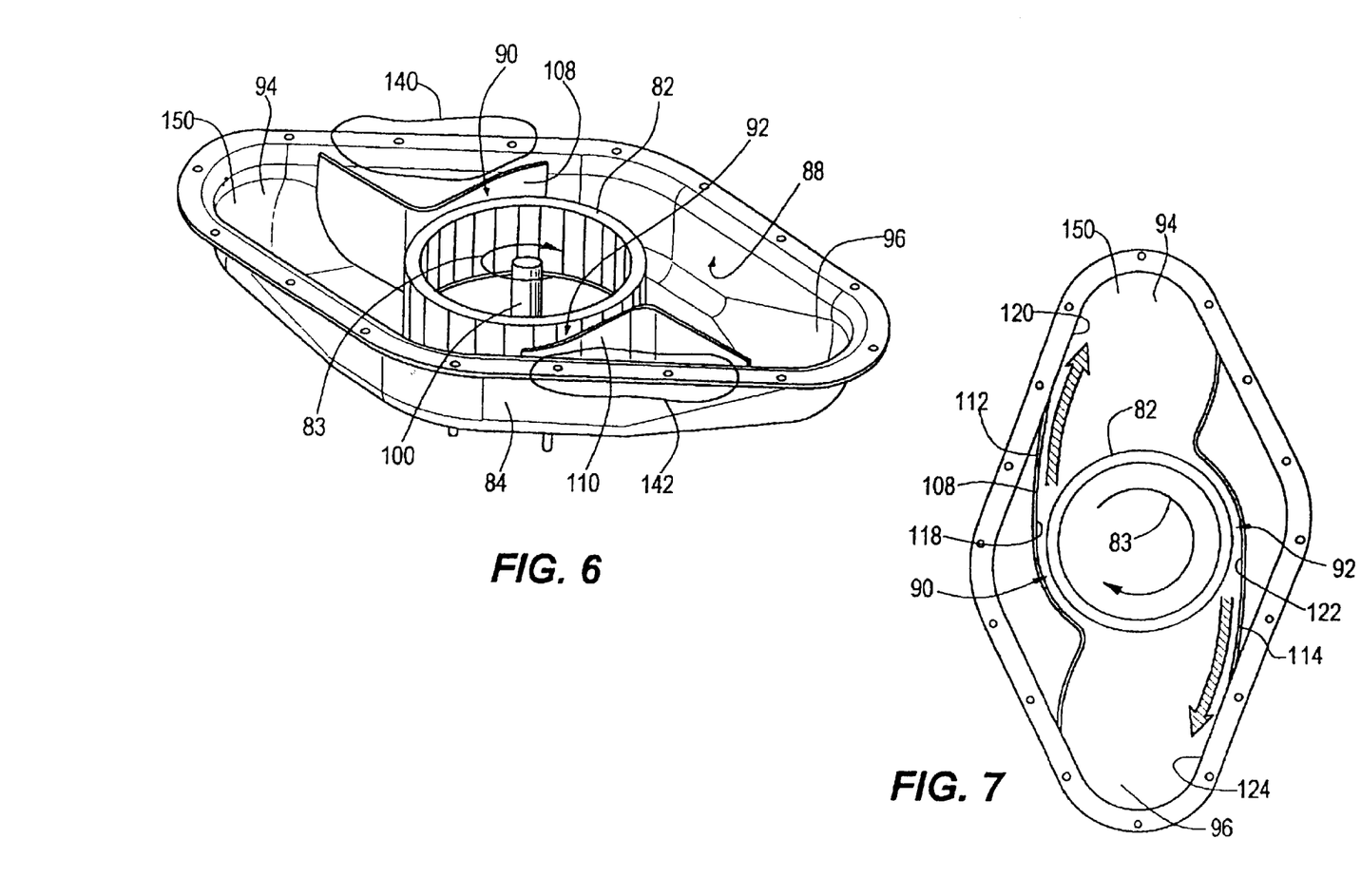
FIG. 6 is an isometric view showing the interior components associated with the fan assembly housing of FIG. 5.
FIG. 7 is a top view of the fan components shown in FIG. 6.
Figure 8:
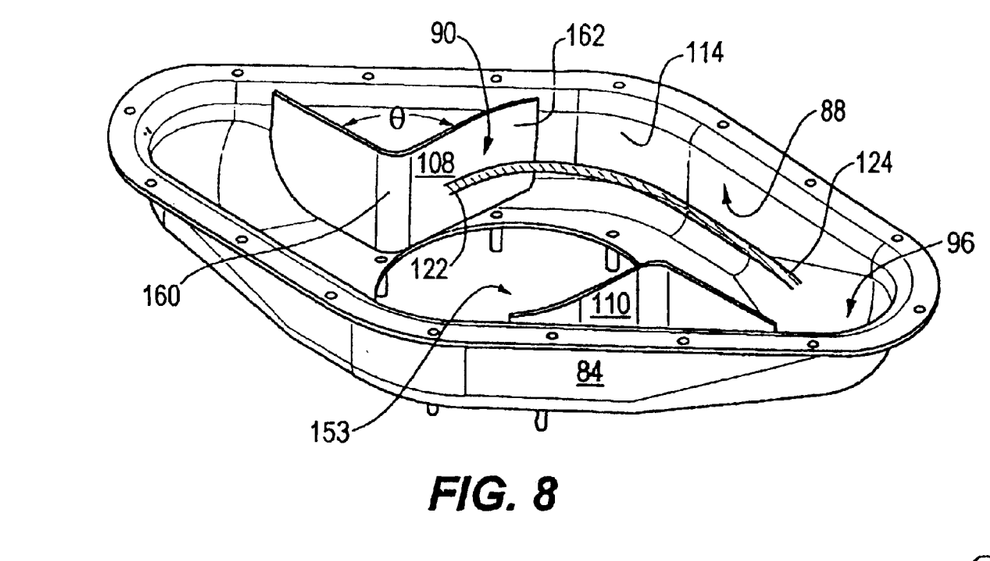
FIG. 8 is a view, similar to FIG. 6, with the fan wheel removed for clarity.

The uniformity of the gas flow in accordance with this invention is possible because each fan, for example, fan 33 shown in FIG. 5, is capable of driving at least two diametrically opposed supply ports 76 and 78 with only one intake port 80 and one rotor, for example fan wheel 82, FIG. 6, within housing 84. Unique fan housing 84 has inner surface 88 forming in conjunction with wheel 82 dual pressurization zones 90 and 92, FIG. 6 and dual outtake regions 94 and 96. Each outtake region is associated with a supply port. So, for example, outtake region 94 is associated with supply port 76, FIG. 5, and outtake region 96 is associated with supply port 76. Wheel 82 is associated with and proximate intake port 80. Pressurization zones 90 and 92, FIGS. 6, 7, and 8 are the areas where the gas is compressed between wheel 82 and housing 84 baffles 108 and 110 and typically the beginning of the spline curves defined by housing 84 inner surface 88. Whether pressurization zones 90 and 92 are the areas of highest pressure within housing 84 depends in part on whether the housing is connected to a bucket.

Fan wheel 82 rotates via shaft 100 of motor M in the direction indicated by arrow 83 and has a diameter and a position within housing 84 such that the periphery of the wheel 82 forms with housing 84 pressurization zones 90 and 92. The periphery of wheel 82 is, for example, 1/16 to 1/18 of an inch from baffle wall areas 108 and 110.

These baffles, which make up a portion of the inner surface 88 of housing 84, assist in defining or forming at least two spline curves 112 and 114, FIG. 7, each having a starting node proximate the periphery of fan wheel 82 where it is closest to the inner surface 88 of housing 84 (the pressurization zone) and a terminating node proximate an outtake region 94 or 96.

Thus, spline curve 112 has a staring node 118 and a terminating node 120 and spline curve 114 has a starting node 122 and terminating node 124. Alternatively, baffles 108 and 110 may be absent and inner surface 88 could follow the curved shape shown in the drawings by eliminating housing areas 140 and 142. In the preferred embodiment, however, baffles 108 and 110 are included to reduce the otherwise sharp curvatures which would be required in housing 84 and thereby to facilitate fabrication.

Housing 84 is typically aluminum or stainless steel and outtake regions 94 and 96 are preferably diametrically opposed from each other as shown. Baffles 108 and 110 are also preferably aluminum or stainless steel. Each outtake region is curved at a radius 150 (for example 1.88 inches—see FIGS. 10–12) in housing 84. Pressurization zones 90 and 92 are preferably diametrically opposed to insure a 50/50 gas distribution to outtake regions 94 and 96. However, other configurations are possible and within the scope of this invention.

In FIG. 8, there is shown orifice 153 which is 1/16 to 1/18 inches larger in diameter than fan wheel 82, FIG. 6. In this way, removal of fasteners 155, FIG. 2, allows motor M and fan wheel 82 to be removed from housing 84, FIG. 8 for easier servicing. In the prior art, housing 84 would have to be removed from its mount.

Figure 9:
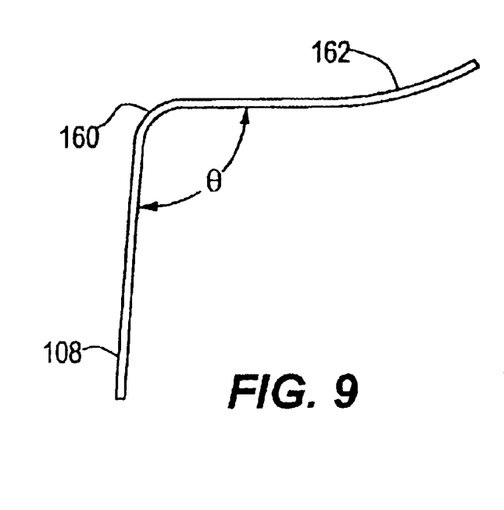
FIG. 9 is a top view of one of the baffles shown in FIGS. 6, 7, and 8.
Figures 10, 12:
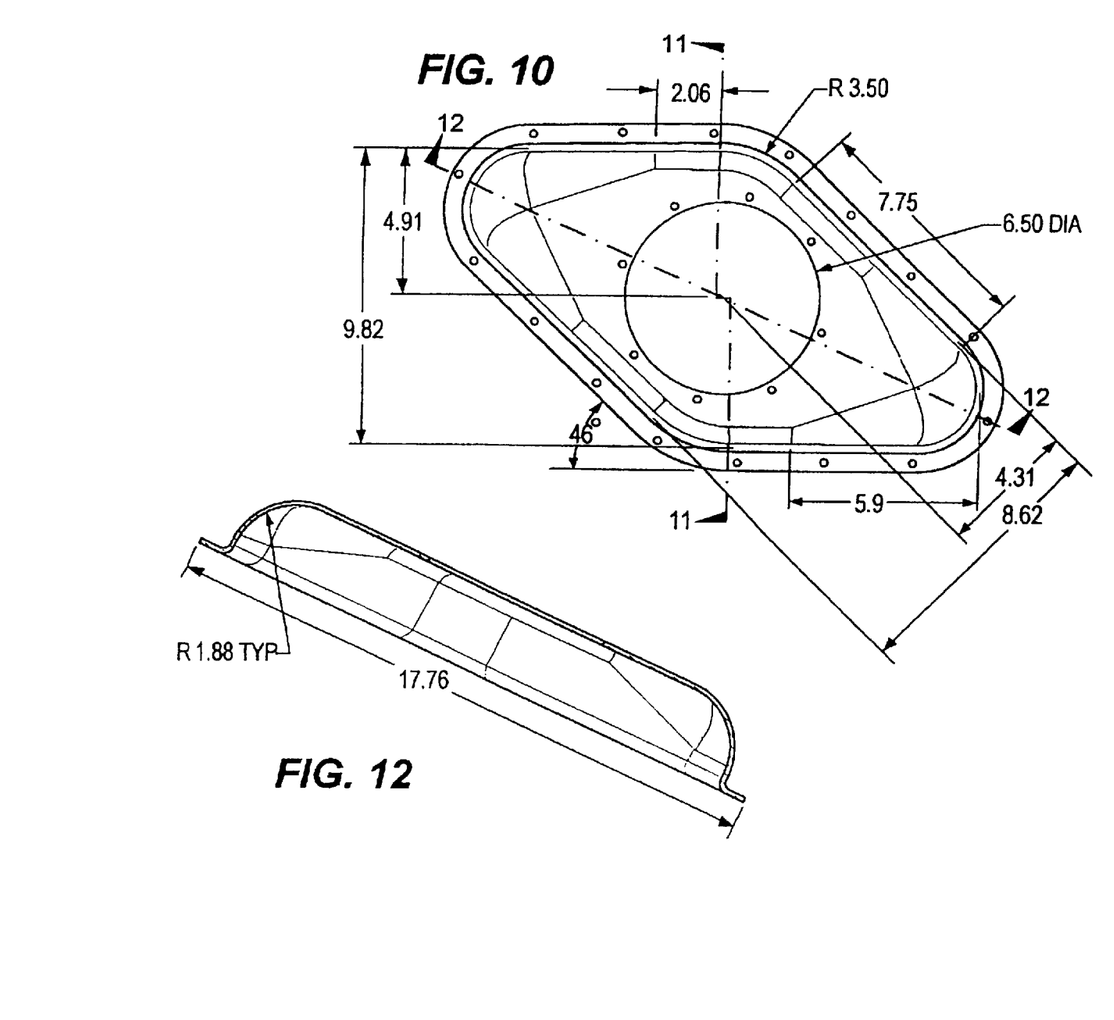
FIG. 10 is a top plan view of one particular embodiment of the fan housing and its associated dimensions in accordance with the subject invention.
FIG. 12 is a sectional view taken along line 12—12 of FIG. 10.
Figure 11:
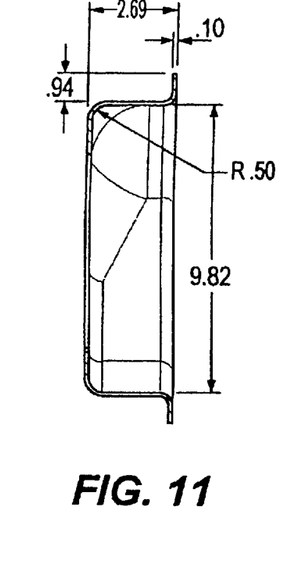
FIG. 11 is a sectional view taken along line 11—11 of FIG. 10.

FIG. 8 also shows more clearly baffles 108 and 110, spline curve 114, pressurization zone 90, and outtake region 96. Also shown is starting node 122 and terminating node 124 of spline curve 114 defined by the shape of housing 84 inner surface 88 as modified by baffle 108. The preferred shape of baffle 108 is shown in FIG. 9. Crest 160 has a radius of 0.48 inches and angle θ is 94°. The radius at point 162 is approximately 3.5 inches. The other dimensions associated with the preferred housing 84 of this invention are shown in FIGS. 10–12.

Figures 13, 14:
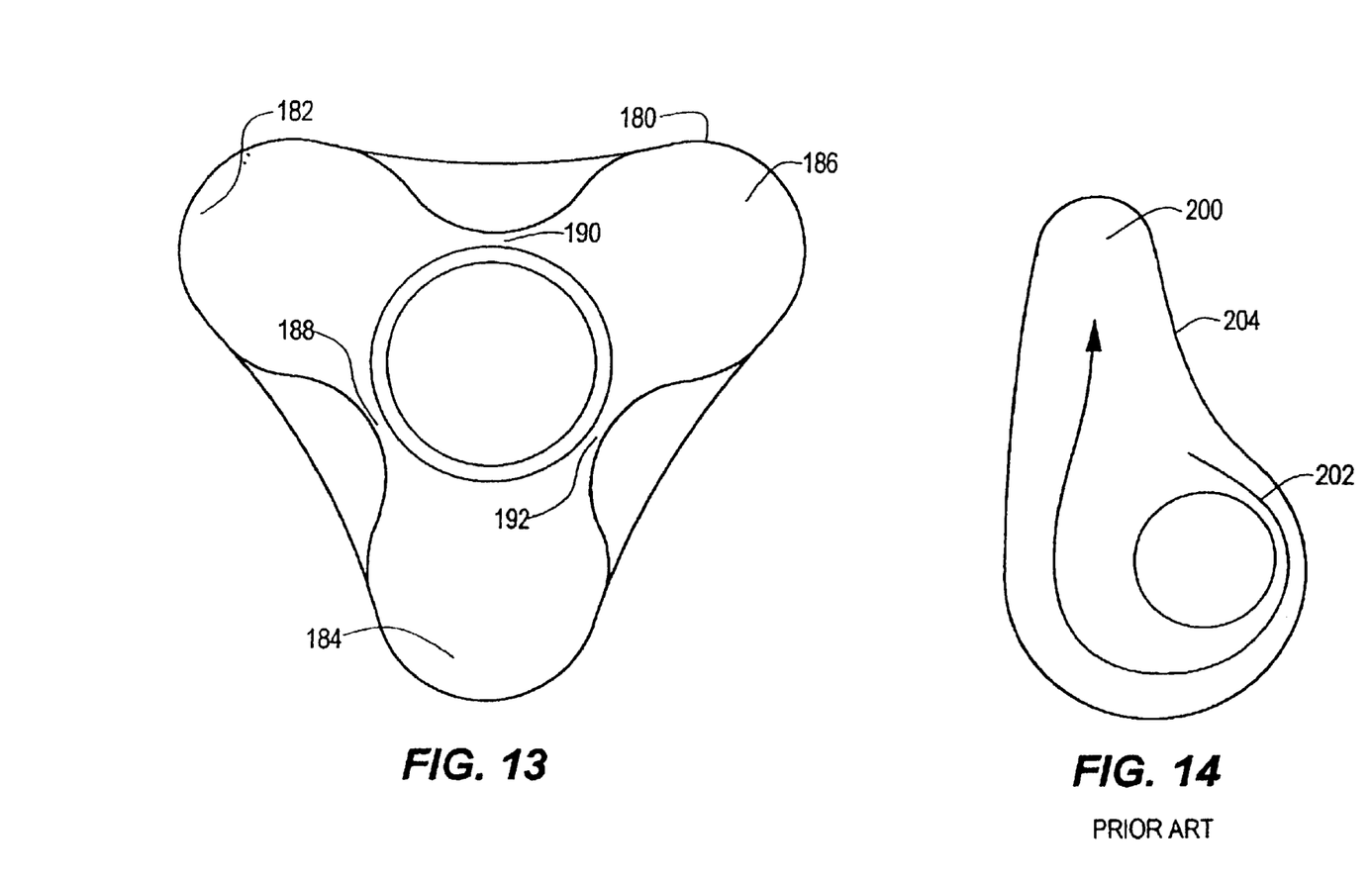
FIG. 13 is a top plan view of an alternative fan housing in accordance with the subject invention.
FIG. 14 is a top plan view of a prior art fan housing.

FIG. 13 depicts a "triple port" fan housing 180 with three outtake regions 182, 184, and 186 in accordance with this invention and three pressurization zones 188, 190, and 192. Again, other configurations are possible.

In contrast, "scroll housing" 204, FIG. 14, of the prior art employed only one outtake region 200 and one pressurization zone 202 per fan. The result was a convection oven with non-uniform gas flow. The fans of the present invention, however, may be used in environments other than reflow solder convection ovens. In the preferred embodiments, each fan of convection oven 10, FIG. 1, is constructed as discussed above with respect to FIGS. 5–8 and result in a reflow solder convection oven with a more uniform gas flow across the heater panels. These novel fans which include two or more supply ports result from two or more diametrically opposed outtake regions in the fan housing and two or more diametrically opposed pressurization zones but there may be embodiments where the supply ports and the outtake regions need not be diametrically opposed.

Although specific features of the invention are shown in some drawings and not in others, this is for convenience only as each feature may be combined with any or all of the other features in accordance with the invention.

What is claimed is:

1. A reflow solder convection oven comprising:
   A) at least one heater element; and
   B) at least one blower assembly in fluid communication with the heater element, the blower assembly including:
      B.1) a mount structure including at least one intake port and at least two supply ports,
      B.2) a fan housing connected to the mount structure, the housing having:
         B.2.a) an interior surface defining at least two pressurization zones, and
         B.2.b) at least two outtake regions, each outtake region proximate a supply port of the fan mount structure,
      B.3) a wheel rotatably disposed in the housing proximate the intake port of the mount structure, the periphery of the wheel positioned in the housing to form the two pressurization zones, the interior surface of the housing defining at least two spline curves, each spline curve having a starting node proximate a pressurization zone where the periphery of the wheel is close to the interior surface of the housing, each spline curve further having a terminating node at an outtake region such that the interior surface of the housing is increasingly and steadily further away from the periphery of the wheel; and
      B.4) a motor attached to the housing and connected to the wheel.

2. The reflow solder convection oven of claim 1 in which there are two diametrically opposed outtake regions.

3. The reflow solder convection oven of claim 1 in which the outtake regions have a radius.

4. The reflow solder convection oven of claim 1 in which there are two pressurization zones diametrically opposed from each other.

5. The reflow solder convection oven of claim 1 in which there are three supply ports, three pressurization zones, and three outtake regions, each outtake region associated with a supply port.

6. A blower assembly comprising:
   at least one intake port;
   at least two supply ports;
   a housing having an interior surface forming at least two pressurization zones and at least two outtake regions, each outtake region associated with a supply port, the housing further including an interior surface defining at least two spline curves, each spline curve having a starting node proximate a pressurization zone where the periphery of the wheel is close to the interior surface of the housing, each spline curve further having a terminating node at an outtake region such that the interior surface of the housing is increasingly and steadily further away from the periphery of the wheel; and
   a rotor disposed in the fan housing.

7. The reflow solder convection oven of claim 6 in which the two outtake regions of the housing are diametrically opposed.

8. The reflow solder convection oven of claim 6 in which each outtake region has a radius.

9. The reflow solder convection oven of claim 6 in which there are two pressurization zones diametrically opposed from each other.

10. The reflow solder convection oven of claim 6 in which there are three supply ports, three pressurization zones, and three outtake regions, each outtake region associated with a supply port.

11. A blower housing comprising:
    a wheel in the housing; and
    an interior surface forming at least two pressurization zones and at least two outtake regions, the interior surface further defining at least two spline curves, each spline curve having a starting node proximate a pressurization zone where the periphery of the wheel is close to the interior surface of the housing, each spline curve further having a terminating node at an outtake region such that the interior surface of the housing is increasingly and steadily further away from the periphery of the wheel.

* * * * *